March 12, 1935.  K. SCHMIDT  1,994,029
ROTARY CONVERTER
Filed Dec. 7, 1933   2 Sheets-Sheet 1
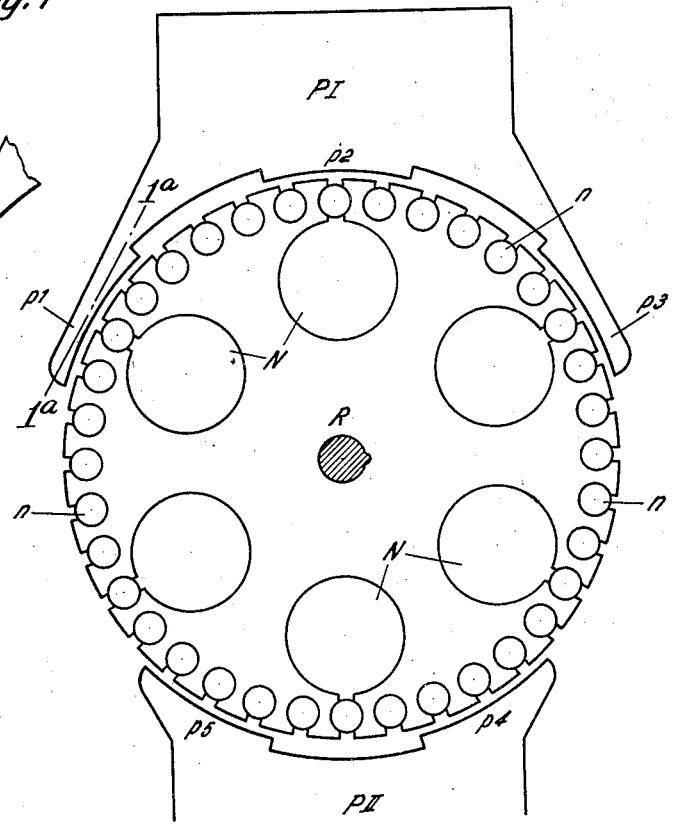
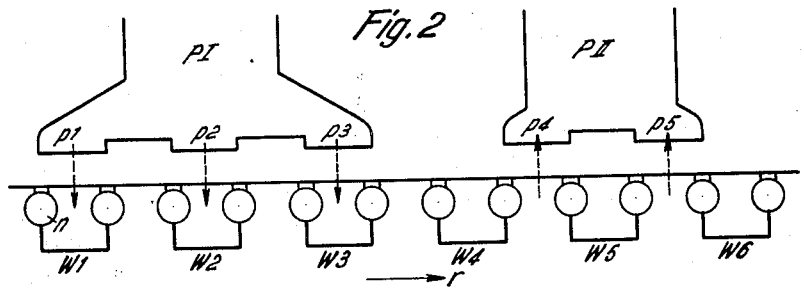
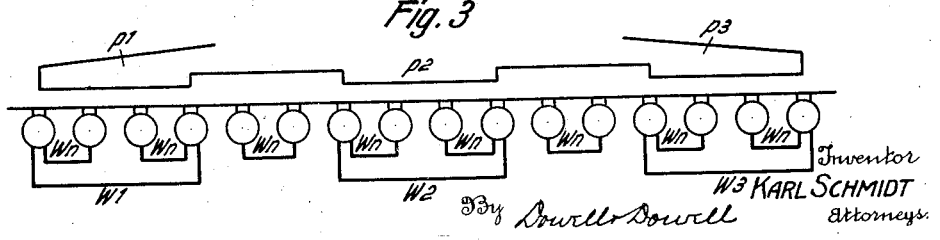
Inventor
KARL SCHMIDT
By Dowell & Dowell
Attorneys

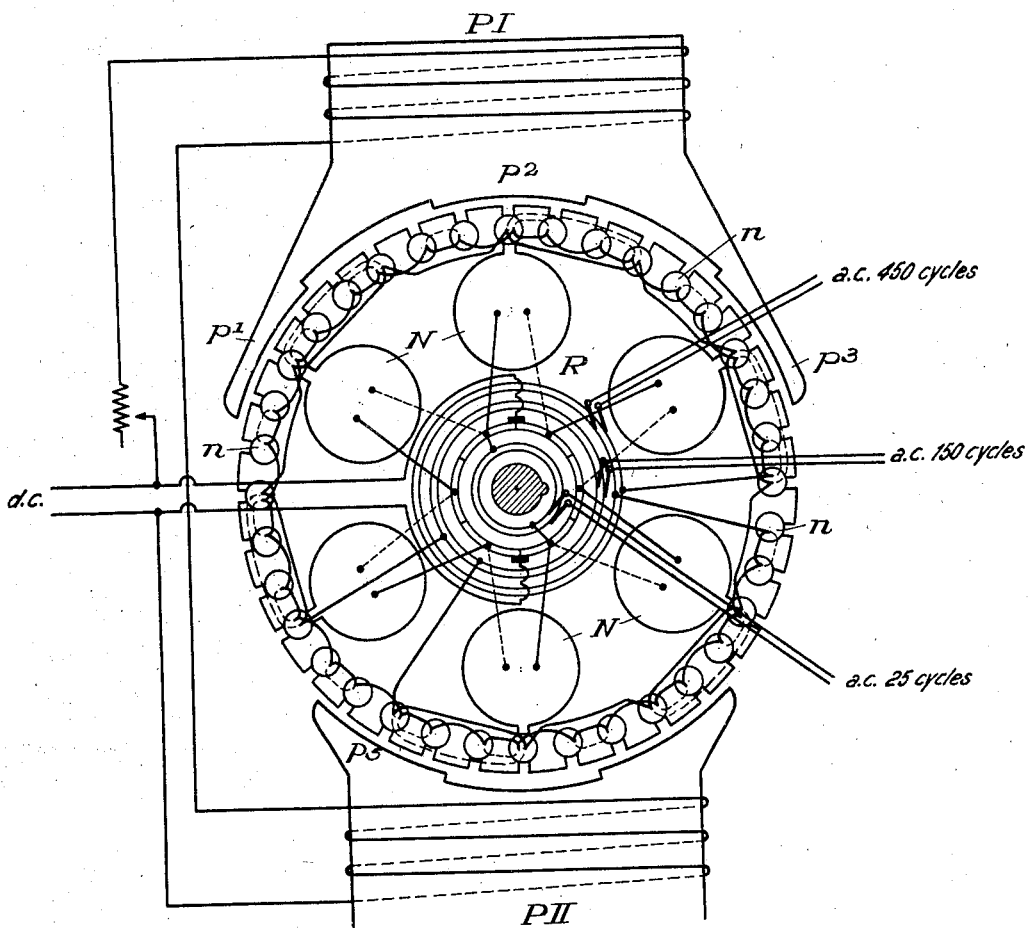

Patented Mar. 12, 1935

1,994,029

UNITED STATES PATENT OFFICE 1,994,029

ROTARY CONVERTER

Karl Schmidt, Berlin-Lichtenrade, Germany

Application December 7, 1933, Serial No. 701,365
In Germany January 16, 1932

5 Claims.  (Cl. 171—123)

This invention relates to rotary converters, more particularly of the type for simultaneous generation of several harmonic frequencies, and is especially applicable to those cases in which it is desired to generate, in the simplest and cheapest manner possible, several currents of different frequencies which are in harmonic relation to each other.

Such a case is met with, for instance, in the so-called "calling machines" for telephone exchanges for signaling purposes. As is well known in connection with telephone exchanges, for the purpose of transmitting the various operating or service signals, for instance for calling up, a frequency of 25 periods per second which gives a deep note is used for the transmission of "busy" signals, a frequency of 150 periods per second which gives a note of medium pitch, and finally for the purpose of transmitting the "hold-on" signal, a frequency of 450 periods per second which produces a relatively high note.

For the simultaneous production of alternating current of 25 cycles and of alternating current of 150 cycles, in accordance with the invention, one of the two poles of the stator is subdivided into three sub-poles, and the other thereof is divided into two sub-poles. The rotor carries two windings, one of which is connected to a commutator adapted to supply D. C. and is also connected to slip rings for the production of A. C. of 25 cycles. The other of these windings has several coils, which are distributed correspondingly to the distribution of the sub-poles and are connected to slip rings. The sub-poles of one polarity are in relation to the said A. C. winding of 150 periods per second displaced relatively to the sub-poles of the other polarity by 180 electrical degrees. A third A. C. winding for the production of currents of 450 cycles may be arranged on the rotor of the machine.

In order that the invention may be thoroughly understood and readily carried into effect, an example of construction in accordance therewith is shown in the accompanying drawings, wherein:

Figure 1 is a section through the poles of the stator and through the rotor of the machine;

Fig. 1a is a fragmentary view of a part of one of the poles, illustrating an alternative arrangement of sub-division;

Fig. 2 shows diagrammatically the winding for producing A. C. of 150 cycles;

Fig. 3 shows diagrammatically some of the windings for producing A. C. of 150 cycles and some of the windings for producing A. C. of 450 cycles; and Fig. 4 shows diagrammatically the arrangement of the three A. C. windings and their connections to the slip rings.

Referring to said drawings, the rotor R is provided with a series of 36 small slots $n$ on its outer surface. In 12 of these slots there lie six coils W1 to W6 of a winding which is adapted to produce A. C. of 150 cycles. Within this ring of slots further slots N are arranged for the direct current and "calling current" winding. The ends of this winding lead to a commutator and to slip rings which carry direct current and from which alternating current of 25 cycles is obtained.

The pole pieces PI and PII of the stator are provided with grooves which sub-divide the pole pieces into sub-poles $p^1$ to $p^5$. These sub-poles induce in the oppositely disposed rotating alternating current windings W1 to W6 medium frequency currents of 150 cycles. The pole piece PI is sub-divided into three poles $p^1$, $p^2$, $p^3$, while the pole piece PII is only sub-divided into sub-poles $p^4$ and $p^5$. This sub-division of the pole pieces of opposite polarity into an unequal number of sub-poles is essential in order that at any instant, currents may be induced in the same direction in the various winding W1 to W6. The sub-poles $p^4$ and $p^5$ and the sub-poles $p^1$, $p^2$, $p^3$ relatively to the winding of the rotor are displaced relatively to each other by 180 electrical degrees. The distance between the sub-pole $p^3$ and the sub-pole $p^4$ of opposite polarity, or between the sub-pole $p^5$ and the sub-pole $p^1$ of opposite polarity, is equal to twice the distance between the sub-poles $p^1$, $p^2$, and $p^3$ or $p^4$ and $p^5$ of similar polarity. The width of the sub-poles $p^1$ to $p^5$, the distances between successive sub-poles of like polarity and the distance between those slots $n$, in which the buzzer windings W1 to W6 are arranged, are equal. The number of coils W1 to W6 of the buzzer winding is always larger than the number of sub-poles $p^1$ to $p^5$ of the machine.

If the rotor is rotated in the direction of the arrow $r$ in Figure 2, then the flux indicated by the arrows below the sub-poles $p^1$ to $p^3$ decreases in the windings W1 to W3 and a current is induced in these coils in a particular direction. At the same time, the flux in the opposite direction indicated by the arrows under the poles $p^4$ and $p^5$ increases in the coils W4 and W5 and a current is thus induced in these coils in the same direction as in the coils W1 and W3.

The ends of the windings W1 to W6 are carried on the slip rings through which the alternating current of 150 cycles which is produced on rotation of the rotor at 1,500 revolutions per minute is transmitted.

Each of the sub-poles $p^1$ to $p^5$ can be further sub-divided by a smaller groove as represented with respect to the sub-pole part $p^1$, shown fragmentarily in Fig. 1ª. An alternating current of 450 cycles will then be produced in a winding W$n$ (Figure 3) corresponding to this sub-division of a sub-pole having its coils arranged in each two neighbouring slots $n$. This further sub-division of the sub-poles is, however, not absolutely essential because the triple frequency of 450 cycles is also in the winding W$n$ induced by the edges of the sub-poles $p^1$ to $p^5$. The voltage of this alternating current is merely increased by means of the intermediate grooves in the sub-poles.

The regular sequence of the windings W1 to W6 and W$n$ is of importance as regards constancy of the frequency of the alternating currents produced. If certain coils are omitted, beats will arise which have a big effect on the constancy of the frequency.

I claim:—

1. A rotory converter for the simultaneous production of alternating current of 25 cycles and of alternating current of 150 cycles, comprising a stator, two pole pieces on said stator of different polarity, three sub-poles on one of said pole pieces, two sub-poles on the other of said pole pieces, a rotor, a commutator, slip rings, two windings on said rotor, the input end of one of said windings being connected to the commutator and the other end of said winding being connected to the slip rings, said winding being dimensioned in such a manner that upon energization by direct current and upon said rotor rotating with a speed of 1500 rotations per minute the said winding produces alternating current of 25 cycles; and the other of said windings being connected to slip rings and adapted to produce alternating current of 150 cycles when the rotor rotates at a speed of 1500 rotations per minute and having its elements distributed corresponding to the distribution of said sub-poles, said sub-poles of one polarity in relation to the said 150 period winding being displaced relatively to said sub-poles of the other polarity by 180 electrical degrees.

2. A rotary converter for the simultaneous production of alternating current of 25 cycles and of alternating current of 150 cycles, comprising a stator, two pole pieces on said stator of different polarity, three sub-poles on one of said pole pieces and two sub-poles on the other of said pole pieces, a rotor, two concentrical rows of slots in said rotor, a commutator, slip rings, a winding the input end of which is connected to the commutator and the other end of which is connected to the slip rings, said winding being arranged in the slots of the inner row of said rows of slots and being dimensioned in such a manner that upon energization by direct current and upon said rotor rotating at 1500 rotations per minute an alternating current of 25 cycles is produced therein, another winding connected to slip rings having its elements distributed corresponding to the distribution of said sub-poles, the last-named winding being arranged in the slots of the outer row of said rows of slots and adapted to produce alternating current of 150 cycles upon rotation of the rotor at 1500 rotations per minute, the width of said sub-poles, the distance between successive sub-poles of like polarity and the distance between said slots of the second winding being equal.

3. A rotary converter for the simultaneous production of alternating current of 25 cycles and of alternating current of 150 cycles, comprising a stator, two pole pieces of different polarity on said stator, three sub-poles of equal size on one of said pole pieces, two sub-poles of equal size on the other of said pole pieces, all said sub-poles and spaces between sub-poles of a pole piece being of the same width and the distance between neighboring sub-poles of pole-pieces of different polarity being equal to twice said distance between sub-poles of a pole piece, a rotor, two concentrical rows of slots on said rotor, a commutator, slip rings, a winding arranged in the slots of the inner row of said rows of rotor slots with the input end thereof connected to the commutator and the other end thereof connected to the slip rings; said winding being dimensioned in such a manner that upon energization by direct current when said rotor is rotating at 1500 rotations per minute an alternating current of 25 cycles will be produced therein, another winding comprising 6 coils arranged in 12 slots of the outer row of said rows of rotor slots, the width of each coil and the distance between two neighboring coils being equal to the width of a sub-pole; the last-named winding being connected to slip rings and adapted to produce alternating current of 150 cycles upon rotation of the rotor at 1500 revolutions per minute.

4. A rotary converter for the simultaneous production of alternating current of 25, 150 and 450 cycles, comprising a stator, two pole pieces on said stator of different polarity, three sub-poles of equal size on one of said pole pieces, two sub-poles of equal size on the other of said pole pieces, all of said sub-poles and the spaces between sub-poles of a pole piece being of the same width and the distance between neighboring sub-poles of pole pieces of different polarity being equal to twice said distance between sub-poles of a pole piece, a rotor, a commutator, slip rings, a series of slots arranged close beneath the outer surface of said rotor, comprising 36 slots, the space between two neighboring slots being equal to one third of the width of one of said sub-poles, a winding connected to the slip rings and adapted to produce alternating current of 450 cycles upon rotation of said rotor at 1500 rotations per minute; said winding having 18 coils arranged in said 36 slots of the rotor; another winding connected to the slip rings and adapted to produce alternating current of 150 cycles when the rotor rotates at a speed of 1500 revolutions per minute; the said second named winding having 6 coils arranged in 12 slots of said series of rotor slots, the width of each coil and the distance between two neighboring coils being equal to the width of a sub-pole; a further series of slots on said rotor arranged within said first mentioned series of slots and a third winding arranged in said last named series of slots, the last-named winding having its input end connected to the commutator for supplying direct current and its other end connected to the slip rings and said last-named winding being dimensioned in such a manner that upon energization by direct current and upon said rotor rotating at a speed of 1500 rotations per minute an alternating current of 25 cycles will be produced within the winding.

5. A rotary converter for the simultaneous production of alternating current of 25, 150 and 450 cycles, comprising a stator, two pole pieces on said stator of different polarity, three sub-poles of equal size on one of said pole pieces, two sub-poles of equal size on the other of said pole pieces, all of said sub-poles and the spaces between sub-poles of a pole piece being of the same width and the distance between neighboring sub-poles of pole pieces of different polarity being equal to twice said distance between sub-poles of a pole piece, grooves in said sub-poles subdividing them into sections of equal size, a rotor, a commutator, slip rings, a series of slots arranged close beneath the outer surface of said rotor, comprising 36 slots, the space between two neighboring slots being equal to one third of the width of one of said sub-poles, a winding connected to the slip rings and adapted to produce alternating current of 450 cycles upon rotation of the rotor at 1500 rotations per minute; said winding having 18 coils arranged in said 36 slots; another winding connected to the slip rings and adapted to produce alternating current of 150 cycles upon rotation of the rotor at 1500 rotations per minute; the second-named winding having 6 coils arranged in 12 slots of said series of slots, the width of each coil and the distance between two neighboring coils being equal to the width of a sub-pole; a further series of slots on said rotor arranged within said first mentioned series of slots and a third winding arranged in said last-named series of slots, the last-named winding having its input end connected to the commutator for supplying direct current and its other end connected to the slip rings, said last-named winding being dimensioned in such a manner that upon energization by direct current and upon said rotor rotating at a speed of 1500 rotations per minute an alternating current of 25 cycles will be produced within the winding.

KARL SCHMIDT.